United States Patent Office 3,016,366
Patented Jan. 9, 1962

3,016,366
POLYMERIZATION OF PYRROLIDONE AND PI-
PERIDONE EMPLOYING N-SUBSTITUTED SEC-
ONDARY AMIDES
Samuel A. Glickman, Easton, and Edgar Shelley Miller, Bethlehem, Pa., assignors to General Aniline & Film Corporation, New York, N.Y., a corporation of Delaware
No Drawing. Filed Apr. 4, 1958, Ser. No. 726,330
10 Claims. (Cl. 260—78)

The present invention relates to the polymerization of 5- and 6-membered lactams, such as pyrrolidone and piperidone.

The polymerization of a lactam, such as pyrrolidone, proceeds via a ring-chain polymerization to give polyamides of 4-aminobutyric acid. Thus:

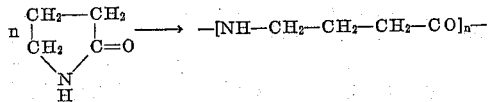

The recurring unit is one which might hypothetically arise in the condensation polymerization of 4-aminobutyric acid. However, early investigators, namely Gabriel (Berichte 32, 1266 (1899)) and Schotten (Berichte 21, 2240 (1880), observed that 4-aminobutyric acid and 5-aminovaleric acid failed to undergo intermolecular condensation and yielded only the five and six membered lactams. The first disclosure of such polyamides was that of U.S.P. 2,638,463 (W. O. Ney, W. R. Nummy and C. E. Barnes—May 12, 1953), involving the polymerization of pyrrolidone in the presence of an alkaline polymerization catalyst.

While useful polymers are obtained by the process described in the Ney, Nummy and Barnes patent, No. 2,638,463, considerable difficulty is encountered in obtaining these polymers in satisfactory yields; and, also, in the production of polymers having relatively high molecular weights. Patent No. 2,739,959 of Ney and Crowther, which, in Example I, discloses that only a small yield of low molecular weight polymer may be obtained when an alkaline polymerization catalyst is employed as the sole promoter of the polymerization of pyrrolidone, discloses effecting the alkaline polymerization of the lactams in the presence of a small amount of an acyl compound, as an activator for the alkaline polymerization catalyst; and preferably, carrying out the polymerization of a lactam while dispersed in an anhydrous hydrocarbon non-solvent therefor, in order to increase the yield and molecular weight of the polymer. The specific activators described in Patent No. 2,739,959, as having the property of increasing the rate of polymerization of lactams having 5- and 6-membered rings, are acyl pyrrolidones, acyl dipyrrolidones, organic peroxides, anhydrous lactones and alkyl esters. The Ney and Crowther patent discloses the use of these acyl compounds as activators for the alkaline polymerization catalyst.

We have now found that a particular class of N-substituted secondary amides are capable of acting as chain initiators in the alkaline catalyzed polymerization of 5- and 6-membered lactams, e.g. of pyrrolidone and piperidone. This class of N-substituted secondary amides has the role of initiating chain growth, whereby a novel type of polymer is produced.

The particular class of N-substituted secondary amides which we have found to be useful for initiating the alkaline catalyzed polymerization of pyrrolidone and piperidone, are those having the following general formulae:

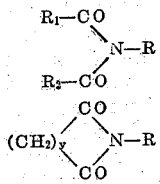

wherein R represents alkyl and aryl; $R^1$ and $R^2$ represent hydrogen, alkyl and aryl; and where y is 2 or 3.

In the instance of the N-substituted cyclic imide shown above, a novel polymer of the following general formula is obtained:

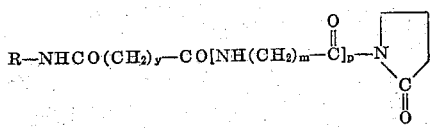

wherein the groups shown have the following meanings:
R=alkyl, aryl
y=2 or 3
m=3 or 4
p=an integer average from 1 to 1000

Specific compounds in the class of N-substituted secondary amides which are useful as chain initiators are:

N-methyl diacetamide $$CH_3CON(CH_3)COCH_3$$

Diacetanilide $$CH_3CON(C_6H_5)COCH_3$$

N-ethyl diformamide $$HCO—N(C_2H_5)CHO$$

N-methyl succinimide

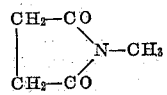

N-phenyl succinimide

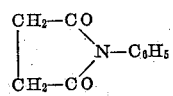

N-ethyl glutarimide

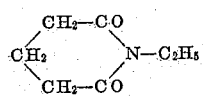

The specificity of substitution requiring a N-substituted secondary amide of the class indicated, may be shown by a consideration of the employ of other compounds. Polymerizations attempted using N-methyl acetamide and diacetamide as chain initiators were unsuccessful, whereas the employ of N-methyl diacetamide led to successful polymerization. In a similar fashion succinimide failed as a chain initiator whereas the substituted imide, viz. N-methyl succinimide, demonstrated chain initiating properties leading to polymerization.

The general conditions and factors utilized for polymerizing 5- and 6-membered lactams, pursuant to the present invention, may be those mentioned in U.S. Patent No. 2,739,959, except for the presence of a N-substituted secondary amide, as the chain initiator for the polymerization in place of the activators specified in that patent. In general, the method of effecting polymerization of 5- and 6-membered ring lactams, by the process of the present invention is as follows:

Initially, there is the preparation of an anhydrous solution of the alkali pyrrolidone in pyrrolidone. The alkali pyrrolidone usually employed is sodio or potassio pyrrolidone, and may be obtained via the reaction of pyrrolidone with sodium and potassium metal or the respective hydroxides. In the latter case, it is essential to remove the water formed thereby as rapidly as possible. The concentration of the alkali pyrrolidone employed in many instances may vary from 0.5 to 5.0 mole percent (percentages based on pyrrolidone), and may range from 0.1 to 10.0 mole percent. In a series of experiments, optimum yields were obtained with about 1.25 mole percent of alkali pyrrolidone. The role of the alkali pyrrolidone is that of a catalyst and serves as a source of pyrrolidone anions.

The amount of chain initiators employed in many instances may vary from 0.1 to 10.0 mole percent (percentage based on pyrrolidone). The concentration of chain initiator chosen, will depend on the conversion desired, and the molecular weight sought. The rate of the polymerization will depend, to a large extent, on the molar amount of chain initiator employed, the higher rates obtained by the use of greater amounts of chain initiator. The polymerizations may be chain initiated at temperatures from 25° C. to 65° C. and are accompanied by a mild exothermic reaction.

In a bulk or mass polymerization, the addition of the chain initiator is followed by a thickening of the solution and gradual solidification of the mixture. The toughness of the cake will, obviously, depend on the extent of the conversion and will be dependent on the times involved and amounts of chain initiators used.

The polymerization employing the foregoing chain initiators may be conducted on a dispersion of pyrrolidone, and the alkali pyrrolidone in a non-solvent for the pyrrolidone. Applicable non-solvents fall in the class of saturated and olefinic aliphatic alicyclic hydrocarbons, i.e., pentane, hexane, heptane, cyclohexane, pentene, cyclohexene, etc. The amount of non-solvent frequently employed is 1 to 3 parts of non-solvent per unit weight of pyrrolidone, but is subject to wide variation. The physical state of the resulting polymer obtained, via a dispersion polymerization may vary from a thick curd to a fine powder, depending on conversion desired, ratio of non-solvent and type as well as rate of agitation.

For the purposes of comparison, there are given below, as Examples A and B, illustrations of the prior art polymerization of highly purified pyrrolidone, from the same batch, and purified in the same manner as the pyrrolidone used in the examples appearing later in the specification of the process of the present invention:

*Example A*

A 500 cc. glass flask was charged with 100.0 grams (1.18 moles) of highly purified pyrrolidone. There is added 1.0 gram of potassium hydroxide flakes of 83% assay, the system immediately placed under a reduced pressure of 10 mm. and rapidly heated to the reflux point of 120 to 125° C. The vapors were condensed in a vertical reflux condenser, maintained at a jacket temperature of 75° C., thus permitting the return of the pyrrolidone and, at the same time, effecting the removal of water. After one hour at the reflux point, the reaction mixture in the still pot was cooled and the clear, colorless solution of potassio pyrrolidone in pyrrolidone allowed to stand for 24 hours at room temperature to the exclusion of atmospheric moisture and carbon dioxide. During the 24 hour period, the mixture become turbid and a scant amount of solid was deposited. The mixture was treated with 400 grams of distilled water, the solid filtered and thoroughly washed with water. The dried polymer weighed 0.6 gram, representing a conversion of 0.6%. The material was of low molecular weight, as indicated by the relative viscosity of a 1% solution in meta cresol.

*Example B*

This example is an illustration of an alternate polymerization of highly purified pyrrolidone, and closely follows Example 1, of U.S. Patent No. 2,739,959, which is also an illustration of prior art polymerization of pyrrolidone.

A 500 cc. glass flask, equipped for vacuum distillation, was charged with 120.0 grams of highly purified pyrrolidone. There is added 1.0 gram of potassium hydroxide flakes of 83% assay. The system was immediately placed under a reduced pressure of 1.0 mm. and rapidly heated to effect the distillation at 90 to 100° C. of 20 grams of pyrrolidone and water. The resulting clear, colorless solution in the still pot constitutes a solution of potassio pyrrolidone in pyrrolidone. The solution was allowed to cool to room temperature and stand for 24 hours to the exclusion of atmospheric moisture and carbon dioxide. During this 24 hour period the mixture become turbid and a scant amount of solid was deposited. The contents were treated with 400 grams of distilled water, the solid filtered and thoroughly washed with water. The dried polymer weighed 0.5 gram, representing a conversion of 0.5%. The material was of low molecular weight as indicated by the relative viscosity of a 1% solution in meta cresol.

The details of the present invention will be apparent to those skilled in the art, from the following specific examples, of preferred methods of practicing the same:

*Example I*

A 500 cc. of glass flask was charged with 100 grams (1.18 moles) of highly purified pyrrolidone. There was then added 1.5 grams of potassium hydroxide flakes of 83% assay, and the mixture immediately placed under a reduced pressure of 10 mm. and rapidly heated to the reflux point of 120–125° C. The vapors were condensed in a vertical reflux condenser, maintained at a jacket temperature of 75° C., thus permitting the return of the pyrrolidone, and, at the same time effecting the removal of water. After one hour at the reflux point, there was obtained a clear colorless solution of potassio pyrrolidone. To this solution at 50° C. was added 0.60 gram (0.0052 mole) of N-methyl diacetamide $$(CH_3CON(CH_3)COCH_3)$$

B.P. 79° at 10 mm.,  1.4498, prepared by the reaction of N-methyl acetamide and acetic anhydride at reflux temperatures. The molar concentration of the chain initiator is 0.44 mole percent based on the pyrrolidone. The solution became cloudy immediately and thickened. In the course of six minutes it turned to a dry-feeling gel. Precautions were taken to exclude moisture and carbon dioxide. After 60 hours, the solid mass was removed from the flask, thoroughly triturated with water to remove unreacted pyrrolidone and dried in a vacuum oven to constant weight. There was obtained 32.6 g. of white solid polymer, representing a conversion of 32.6%. The relative viscosity of a 1% solution in meta cresol was 2.2, and the solid had a M.P. of 253°–255° C.

As an illustration of the specificity of substitution required in the N-subsituted secondary amide used above as the chain initiator, the foregoing example was repeated, using 0.38 gram (.0052 mole) of N-methyl acetamide, in place of the N-methyl diacetamide. There was obtained some 0.7 gram of solid representing a 0.7% conversion to low molecular weight material.

*Example II*

A solution of potassio pyrrolidone in 50 grams (0.59 mole) of pyrrolidone was prepared as described in Example I. To this solution at 50° C., was added 0.75 gram (0.006 mole) of N-ethyl succinimide, prepared by the reaction of succinic anhydride with ethyl amine. The molar concentration of the chain initiator was 1.0%. Within eighteen minutes solid commenced to deposit from the viscous solution. After an eighteen hour period, during which moisture and carbon dioxide were excluded, the contents had been converted into a dry gel which was easily removed from the flask. The material was treated thoroughly with water and methanol to remove unreacted pyrrolidone and dried in a vacuum oven at 80° to constant weight. There was obtained 18.2 grams of white solid polymer, representing a conversion of 36.4%. The relative viscosity of a 1% solution in m-cresol was 2.16 and the solid melted at 252–254° C. The thus obtained polymer had the formula below where "$p$" is an integer average determined by the molecular weight:

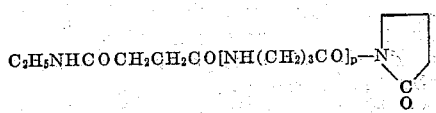

As a further illustration of the specificity of substitution required in the chain initiator, the foregoing experiment was repeated using succinimide in exactly the same molar amount in place of the N-ethyl succinimide. The amount of dry polymer obtained was in the order of 0.6%, comparable to the uninitiated control example reported earlier in Example A.

*Example III*

The following example illustrates the employ of heptane as the medium for the non-solvent suspension polymerization of pyrrolidone using N-phenyl succinimide as the chain initiator.

A 500 cc. flask is charged with 120 grams of highly purified pyrrolidone. There is added 2.0 grams of potassium hydroxide flakes of 83% assay and the system immediately placed under a reduced pressure of 10 mm. In rapid fashion, at total take-off, there is distilled 20 grams of pyrrolidone at 125° C. to ensure the removal of water. The remaining solution of potassio pyrrolidone in pyrrolidone is cooled to 30° C.

The above solution is added to 200 grams of anhydrous heptane in a suitably equipped vessel. To the rapidly agitated mixture at 30° C. is added 1.60 grams (0.0096 mole) of N-phenylsuccinimide. The temperature rise to 36° in the next several minutes is followed by the gradual formation of a soft white curd in the course of 24 hours at high speed stirring becomes a suspension of finely divided white solid. Filtration of the solid, followed by thorough washing with methanol and water to remove excess pyrrolidone and alkali and vacuum drying at 80° C. yielded 40 grams of white polyamide, M.P. 253–255° C. This represents a conversion of 40% with a relative viscosity of 2.87 for a 1% solution in m-cresol.

*Example IV*

Charge a 500 cc. glass flask with 99 grams (1.0 mole) of highly purified piperidone. Add 1.5 grams of potassium hydroxide of 83% assay; place the system immediately under a reduced pressure of 5 mm. and rapidly heat to the reflux point (120–125° C.). Condense the vapors in a vertical reflux condenser maintained at a jacket temperature of 75° C., thus permitting the return of piperidone and, at the same time, effecting the removal of water. After one hour at the reflux point, cool the reaction mixture in the still pot to 50° C. and threat the colorless solution with 1.1 grams (0.006 mole) of N-phenylsuccinimide, corresponding to 0.6 mole percent chain initiator. After 24 hours the resulting white mass was removed from the flask, thoroughly triturated with methanol and water, filtered and dried in a vacuum oven.

The polyamide thus obtained is believed to possess the formula:

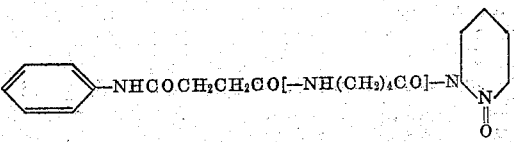

While an N-pyrrolidonyl, or N-piperidonyl group appears to be the usual chain-terminating group of the polymers obtained, pursuant to the present invention, it will be apparent to those skilled in the art, that the polymer chains may be otherwise terminated, for instance, by the formation of the acids and the metal and ammonium salts thereof, as well as esters and amides, which may arise by reaction of the active polymer intermediate with alkaline compounds, hydroxyl-containing compounds, or amines. Therefore, the polymers obtained, pursuant to the present invention, may, generically, be represented by the following general formula:

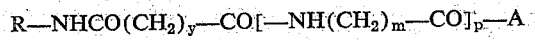

where R equals alkyl, aryl; where $y$ equals 2 or 3; where $p$ is an integer average depending on molecular weight; where "A" represents N-pyrrolidonyl, N-piperidonyl or $NH(CH_2)_mCOY$ radical; where $m$ represents 3 or 4; and Y represents oxymetal, hydroxyl, alkoxy, aryloxy, aralkoxy, aralkoxy, oxyammonium, oxyaminium, amino, alkylamino, arylamino.

As samples of specific reagents, which may be employed to terminate the polymer chains, otherwise than in a pyrrolidonyl or piperidonyl radical, may be mentioned water, sodium hydroxide, sodium methylate, methanol, ethanol, phenol, ammonio, ethylamine, aniline, diethanolamine. Reaction of the free polymer acid with alkaline agents such as metal hydroxides and amines gives the respective salts. The various terminations proceed through scission of the terminal pyrrolidone ring, or one of the polyamide linkages, particularly the linkage between terminal pyrrolidonyl linkage and the carbonyl grouping linked thereto. Termination of the polymer chain by means of an ester, such as —NH—CH$_2$CH$_2$CH$_2$COOCH$_3$ may be accomplished by treatment of the polymer intermediate, with methanol. In a similar fashion, treatment of the polymer obtained in the hexane suspension polymerization with an amine, such as aniline, yields an amide terminated function, of the type

Hydrolysis of the terminal ring may be accomplished by treating the alkaline containing white solid, obtained in the polymerization, with water at 75–80° C. for one hour. The resulting product is terminated by a

group. Conversion to the free acid, and, consequently to the other metal and ammonium salts, is accomplished by acidification and respective action of alkalizing agents.

The products of the present invention are, as indicated, polyamides of the nylon-4 type from pyrrolidone, or nylon-5 from piperidone; and, as such, are useful in the arts as in many applications of nylon. In particular, the products of the present invention, particularly, those of relatively high molecular weight, e.g., products which have a relative viscosity of about 2.5 or higher, as a 1% solution in the m-cresol, are useful for the production of fibers for textile and other uses—e.g., as insulating blankets, etc. Fibers have been successfully produced from products of the present invention, by drawing from a melt and spinning from solutions, such as solution in formic acid, followed by evaporation of solvent. Useful films, having a wide variety of applications, may also be produced from the products of the present invention by melt-extrusion, by film-casting from solutions, such as a formic acid solution, glycolic or lactic acid solution, followed by removal of the solvent. Such films are useful in numerous applications, including electrical applications, as an insulator; as a base for industrial tapes; as a lining material or glass replacement, and in a variety of special packaging applications. The products of the present invention may also be used in plastic compression molding and extrusion molding applications, where their crystalline nature, sharp melting point and marked fluidity, in the molten state, results in faithful reproduction of the mold. Molded products, for use as containers, may be produced from powders obtained pursuant to the present invention; and, also, many mechanical and other engineering parts and materials, such as gears, cams, bearings, and similar machine components may be produced from them. In the electrical arts, the products of the present invention are useful as a coating on wire, etc., as an insulation, and for the production of certain mechanical, electrical parts, such as insulating bushings, fuse holders, and the like. The products are also of interest in the coating arts as finishes for textiles, paper and similar fibrous materials, and for use as special adhesives and other coatings.

It should also be understood that the products of the present invention may be compounded in many applications with other synthetic plastic materials, plasticizers and fillers. Among the plasticizers, which have been found to be compatible with the products of the present invention, may be mentioned, o- and p-toluenesulfonamide, N-ethyl o- and p-toluenesulfonamide, ethylene carbonate and propylene carbonate.

While the production of polymers of 2-pyrrolidone and 2-piperidone has specifically been described in the foregoing examples it will be apparent that the process of the present invention may be employed for the production of polymers of homologues of 2-pyrrolidone and 2-piperidone which contain a lower alkyl (1–4 carbon atoms) substituent on the carbon atoms in the ring. Such alkyl substituted pyrrolidones and piperidones which have been found to be most readily polymerized by the process of this invention are those in which certain alkyl substituents in 3 and 4 position such as 3-methyl-2-pyrrolidone, 4-methyl-2-pyrrolidone, 4-ethyl-2-pyrrolidone, 3,3-dimethyl-2-pyrrolidone, 4,4-dimethyl-2-pyrrolidone, 3-methyl-2-piperidone, and 3-ethyl-2-piperidone. The alkyl substituted pyrrolidones and piperidones may be represented by the general formula

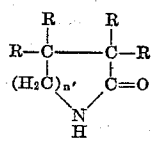

or

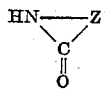

wherein Z represents

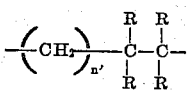

where $n'$ is one of the integers 1 and 2 and the R's represent a member of the group consisting of H and lower alkyl groups of 1 to 4 carbons atoms. The polymeric unit of the polymers produced on polymerizing them in accordance with the present invention may thus be represented by the general formula

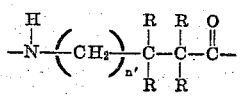

or

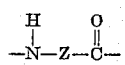

We claim:
1. In the process of polymerizing lactams of the formula

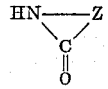

wherein Z represents

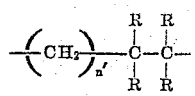

where $n'$ is an integer from 1 to 2 and R represents a member of the group consisting of H and lower alkyl groups of 1 to 4 carbon atoms, under essentially anhydrous conditions and in the presence of a minor amount up to about 10 mole percent based on said lactam of an alkali metal lactam as the polymerization catalyst; the improvement comprising effecting the polymerization in the presence of a minor amount up to about 10 mole percent based on said lactam of an N-substituted secondary amide selected from the group consisting of secondary amides of the formula

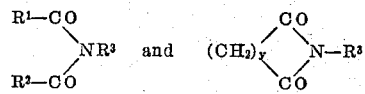

wherein $R^3$ represents a member of the group consisting of alkyl and aryl, and $R^1$ and $R^2$ each represent a member of the group consisting of hydrogen and alkyl and $y$ is an integer from 2 to 3.

2. In the process of polymerizing pyrrolidone under essentially anhydrous conditions in the presence of a minor amount up to about 10 mole percent based on said pyrrolidone of an alkali metal pyrrolidone as the polymerization catalyst; the improvement comprising effecting the polymerization in the presence of a minor amount up to about 10 mole percent based on said pyrrolidone of an N-substituted secondary amide selected from the group consisting of secondary amides of the formula

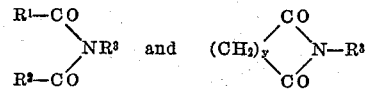

wherein $R^3$ represents a member of the group consisting of alkyl and aryl, and $R^1$ and $R^2$ each represent a member of the group consisting of hydrogen and alkyl and $y$ is an integer from 2 to 3.

3. In the process of polymerizing piperidone under essentially anhydrous conditions in the presence of a minor amount up to about 10 mole percent based on said piperidone of an alkali metal piperidone as the polymerization catalyst; the improvement comprising effecting the polymerization in the presence of a minor amount up to about 10 mole percent based on said piperidone of an N-substituted secondary amide selected from the group consisting of secondary amides of the formula

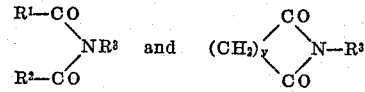

wherein $R^3$ represents a member of the group consisting of alkyl and aryl, and $R^1$ and $R^2$ each represent a member of the group consisting of hydrogen and alkyl and $y$ is an integer from 2 to 3.

4. In the process of polymerizing pyrrolidone under essentially anhydrous conditions and in the presence of a minor amount up to about 10 mole percent based on said pyrrolidone of an alkali metal pyrrolidone as the polymerization catalyst; the improvement comprising effecting the polymerization in the presence of a minor amount up to about 10 mole percent based on said pyrrolidone of N-methyl diacetamide.

5. In the process of polymerizing pyrrolidone under essentially anhydrous conditions and in the presence of a minor amount up to about 10 mole percent based on said pyrrolidone of an alkali metal pyrrolidone as the polymerization catalyst; the improvement comprising effecting the polymerization in the presence of a minor amount up to about 10 mole percent based on said pyrrolidone of an N-alkyl succinimide.

6. In the process of polymerizing pyrrolidone under essentially anhydrous conditions and in the presence of a minor amount up to about 10 mole percent based on said pyrrolidone of an alkali metal pyrrolidone as the polymerization catalyst; the improvement comprising effecting the polymerization in the presence of a minor amount up to about 10 mole percent based on said pyrrolidone of N-methyl succinimide.

7. In the process of polymerizing pyrrolidone under essentially anhydrous conditions and in the presence of a minor amount up to about 10 mole percent based on said pyrrolidone of an alkali metal pyrrolidone as the polymerization catalyst; the improvement comprising effecting the polymerization in the presence of a minor amount up to about 10 mole percent based on said pyrrolidone of an N-aryl succinimide.

8. In the process of polymerizing pyrrolidone under essentially anhydrous conditions and in the presence of a minor amount up to about 10 mole percent based on said pyrrolidone of an alkali metal pyrrolidone as the polymerization catalyst; the improvement comprising effecting the polymerization in the presence of a minor amount up to about 10 mole percent based on said pyrrolidone of N-phenyl succinimide.

9. In the process of polymerizing piperidone under essentially anhydrous conditions and in the presence of a minor amount up to about 10 mole percent based on said piperidone of an alkali metal piperidone as the polymerization catalyst; the improvement comprising effecting the polymerization in the presence of a minor amount up to about 10 mole percent based on said piperidone of an N-aryl succinimide.

10. In the process of polymerizing piperidone under essentially anhydrous conditions and in the presence of a minor amount up to about 10 mole percent based on said piperidone of an alkali metal piperidone as the polymerization catalyst; the improvement comprising effecting the polymerization in the presence of a minor amount up to about 10 mole percent based on said piperidone of N-phenyl succinimide.

References Cited in the file of this patent

UNITED STATES PATENTS

| | | |
|---|---|---|
| 2,809,958 | Barnes et al. | Oct. 15, 1957 |
| 2,854,458 | Reppe et al. | Sept. 30, 1958 |